United States Patent [19]

Brandt

[11] Patent Number: 5,382,359

[45] Date of Patent: Jan. 17, 1995

[54] PLASTIC FUEL FILTER WITH CONDUCTIVE COATING FOR PROVIDING AN EVAPORATIVE BARRIER AND FOR DISSIPATING ELECTROSTATIC CHARGES

[75] Inventor: Timothy B. Brandt, West Des Moines, Iowa

[73] Assignee: Parr Manufacturing, Inc., Des Moines, Iowa

[21] Appl. No.: 61,167

[22] Filed: May 13, 1993

[51] Int. Cl.⁶ .................. B01D 27/08; B01D 35/02; B01D 35/06
[52] U.S. Cl. .................................. 210/243; 210/440; 361/215
[58] Field of Search ............... 210/243, 748, 440; 361/212, 215, 216

[56] References Cited

U.S. PATENT DOCUMENTS

| | | | |
|---|---|---|---|
| 1,871,103 | 8/1932 | White | 361/215 |
| 2,524,509 | 10/1950 | Barney | 361/215 |
| 3,160,785 | 12/1964 | Munday | 361/215 |
| 3,186,551 | 6/1965 | Dornauf . | |
| 3,914,002 | 10/1975 | Berliner et al. | 361/215 |
| 3,929,641 | 12/1975 | Dukek . | |
| 3,933,643 | 1/1976 | Colvin et al. . | |
| 3,943,273 | 3/1976 | de Putter | 174/47 |
| 4,187,179 | 2/1980 | Harms . | |
| 4,196,464 | 4/1980 | Russell . | |
| 4,215,384 | 7/1980 | Elson | 361/215 |
| 4,319,303 | 3/1982 | Thorn . | |
| 4,322,232 | 3/1982 | Beane | 210/243 |
| 4,378,322 | 3/1983 | Atterbury et al. . | |
| 4,664,971 | 5/1987 | Soens . | |
| 4,675,143 | 6/1987 | Wakita et al. . | |
| 4,686,071 | 8/1987 | Rosenzweig et al. . | |
| 4,948,515 | 8/1990 | Okumura et al. | 210/748 |
| 4,999,108 | 3/1991 | Koch et al. . | |
| 5,076,920 | 12/1991 | Danowski et al. . | |
| 5,081,326 | 1/1992 | Usui | 138/137 |
| 5,151,198 | 9/1992 | McCullough, Jr. et al. | 210/767 |
| 5,164,084 | 11/1992 | Danowski et al. . | |
| 5,164,879 | 11/1992 | Danowski et al. . | |

FOREIGN PATENT DOCUMENTS

| | | |
|---|---|---|
| 0176866 | 4/1985 | European Pat. Off. . |
| 1541025 | 7/1968 | France . |
| 3918342 | 4/1990 | Germany . |

OTHER PUBLICATIONS

Copy of Article-pp. 383-394 from Journal of Colloid and Interface Science, vol. 32, No. 3, Mar. 1970 and entitled Effect of Conductivity on Charge Generation in Hydrocarbon Fuels Flowing Through Fiber Glass Filters.

Primary Examiner—Neil McCarthy
Attorney, Agent, or Firm—Henderson & Sturm

[57] ABSTRACT

A fuel filter having a plastic housing with a chamber therein for receiving a non-polar fluid such as fuel has an inlet and an outlet to the chamber and a filter media is disposed within the chamber for filtering the fuel flowing therethrough. A coating is provided for conducting electricity from the inside of the housing to the outside of the housing to a common electrical plane. This conductive path is preferably provided by merely coating the entire fuel filter, both inside and out with a conductive coating, such as chromium.

12 Claims, 1 Drawing Sheet

PLASTIC FUEL FILTER WITH CONDUCTIVE COATING FOR PROVIDING AN EVAPORATIVE BARRIER AND FOR DISSIPATING ELECTROSTATIC CHARGES

TECHNICAL FIELD

The present invention relates generally to a fuel filter and more particularly to a fuel filter having an electrically non-conductive housing, a coating for preventing evaporative emissions through the housing and providing an electrically conductive path between the fuel within the housing and a common electrical plane outside of the housing.

BACKGROUND ART

Historically most fuel filters in the past have been constructed of metal. In recent years, in an attempt to use a lighter substance, plastic fuel filters have been manufactured, for example of nylon. It has been determined that in a plastic fuel filter, i.e. those constructed of an electrically non-conductive material, as the fuel is filtered through the filter media, electrons are stripped off and these electrons collect on the inside of the plastic fuel filter. In some instances, this condition has caused arcing of these electrostatic charges from the inside of the housing, through the housing in an attempt to reach a common electrical plane such as the ground of a vehicle chassis. U.S. Pat. Nos. 5,076,920; 5,164,084 and 5,164,879 all to Danowski et al address this problem and ostensibly solve it by mixing stainless steel fibers in the plastic resin so that an electrically conductive path is provided through the housing to a common electrical plane, such as the chassis of a vehicle to which the fuel filter is attached. Previous to that, this problem was somewhat unwittingly solved by FIG. 3 of French Patent No. 1,541,025 published Oct. 4, 1969, which shows a fuel filter constructed of a plastic material with metallic materials disposed therein, albeit that the purpose was actually dissipate heat.

It has also come to light recently that another problem with the plastic fuel filter is that it will allow some evaporation of fuel therethrough under certain conditions. Consequently, there is a need for a solution to the use of plastic fuel filters which solve both of the aforementioned problems, specifically the electrostatic charge buildup and the evaporative fuel problem.

DISCLOSURE OF THE INVENTION

The present invention relates generally to a fuel filter having a plastic housing with a chamber therein for receiving a non-polar fluid such as fuel. There is an inlet and an outlet to the chamber and a filter media is disposed within the chamber for filtering the fuel flowing therethrough. A structure is provided for conducting electricity from the inside of the housing to the outside of the housing to a common electrical plane, rather than providing a path through the housing as suggested by the prior art referred to above. This conductive path is preferably provided by merely coating the entire fuel filter, both inside and out with a conductive coating, such as chromium.

An object of the present invention is to provide a plastic fuel filter with a barrier to evaporative emissions.

Another object of the present invention is to provide a plastic fuel filter with a structure for dissipating electrostatic charges that tend to build up on the inside of a plastic fuel filter.

A still further object of the present invention is to provide a plastic fuel filter which solves both of the problems of evaporative emissions and the buildup of electrostatic charges inside the housing by the use of a single structure which accomplishes both of the functions of being a barrier to evaporative emissions and providing a path for electrostatic charges to pass from the inside of the housing to a common electrical plane outside of the housing, without going through the housing itself.

Other objects, advantages, and novel features of the present invention will become apparent from the following detailed description of the invention when considered in conjunction with the accompanying drawings.

BEST MODE FOR CARRYING OUT THE INVENTION

Figure 1:
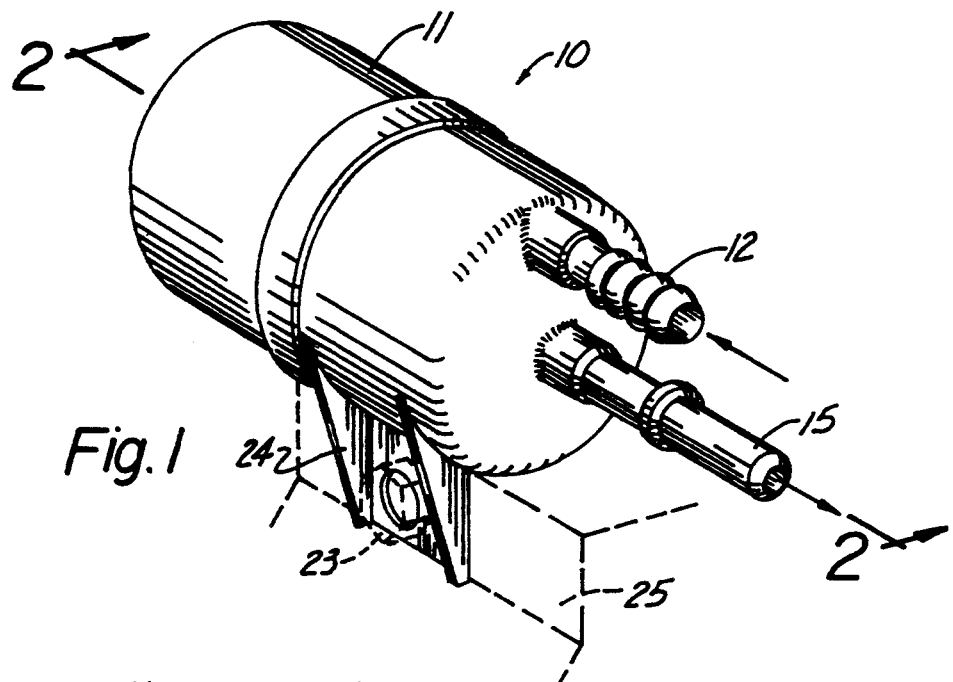
FIG. 1 shows a perspective view of a plastic fuel filter constructed in accordance with the present invention bolted to the chassis of a motor vehicle.
Figure 2:
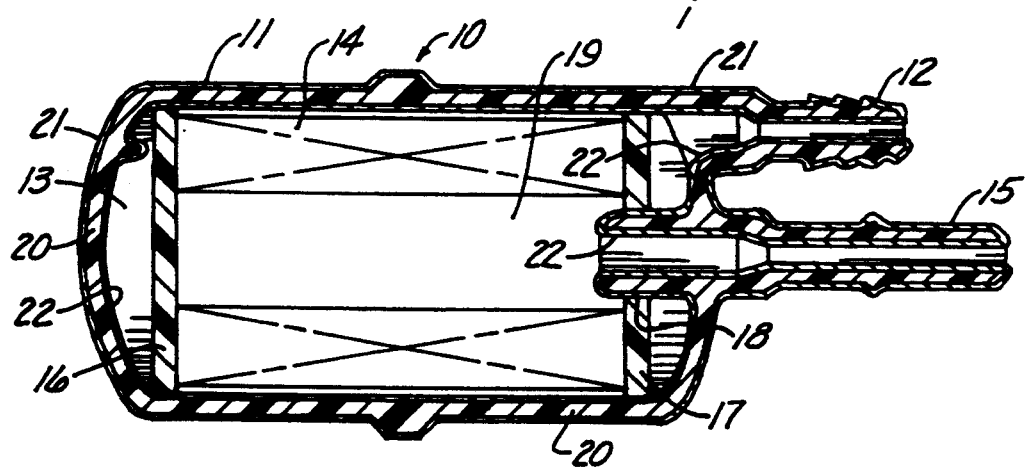
FIG. 2 is a cross sectional view taken along line 2—2 of FIG. 1.

Referring now to the drawings wherein like reference numerals designate identical or corresponding parts throughout the several views, FIG. 1 shows a fuel filter (10) having a plastic body (11) constructed of an electrically non-conductive material such as nylon. An inlet tube (12) is connected to a vehicle fuel supply system and allows fuel to enter the chamber (13), pass through a filtering media (14) such as paper or the like and out the outlet tube (15) to continue on to supply fuel to the engine of a motor vehicle or the like.

Disk-like members (16) and (17) hold the filter media (14), which can be an accordion pleat in an annular shape sealed at the ends thereof to the plates (16) and (17). An annular seal (18) goes around the inner end of the outlet tube (15) for assuring that all of the fuel that enters the inlet tube (12) must first pass through the filter media into the inner chamber (19) before it will pass out through the outlet tube (15).

The housing (11) includes a main body portion (20) constructed of a plastic material such as nylon which is electrically non-conductive. An outside coating (21) can be of any electrically conductive material and an inner coating (22) can also be of any electrically conductive material, but is preferably the same material as on the outside coating (21). The entire fuel filter (10), in its preferred embodiment, is merely plated both inside and out with chromium. Other conductive materials can be used instead, for example nickel, copper, stainless steel, aluminum, etc. Furthermore, the method of coating the entire fuel filter (10) can be done other than by plating, for example by vacuum metalization, using conductive paints, sputtering, etc.

In use, the fuel filter is merely bolted to a vehicle, for example by using a threaded bolt (23) which connects bracket (24) to a common electrical plane such as a bracket (25) made of metal which would be electrically connected to the engine or the automotive chassis at some point. The element (25) could merely be the engine block.

Once the fuel supply hoses are connected to the inlet (12) and outlet (15), the fuel system is essentially ready to operate. As the fuel passes through into the inlet and through the filter media, electrons are stripped off of the fuel and will tend to migrate to the inner electrically conductive material coating (22). These electrons will flow from the inside out, along the inner coating (22), through both the inlet and outlet tubes (12) and (15). Because of the difference in potential between the electrostatic charge buildup inside the filter and the common electrical plane represented by (25), these electrons will merely flow to the outside coating (21) and through coated bracket (24) to the common electrical plane represented by (25). Since the bracket (24) is formed integrally in one piece with the housing (11), it will also be coated with the electrically conductive material and will make good electrical contact with metal bolt (23) and common electrical ground member (25). The metal plating (21) and (22) covering both the inside and outside of plastic housing (20) also provides a barrier to evaporative emissions.

Accordingly, it will be appreciated that the preferred embodiment disclosed above does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. A fuel filter comprising:
   a housing made of an electrically non-conductive material;
   said housing having inside and outside surfaces;
   means for providing a chamber within said housing for receiving a non-polar fluid;
   inlet means attached to said housing for permitting fuel under pressure to enter said chamber;
   outlet means attached to said housing for permitting fuel to flow from said chamber; and
   a conductive coating covering and connecting at least a portion of said inside and outside surfaces of said housing for providing an electrically conductive path between fuel within said housing and a common electrical plane outside of said housing, said electrically conductive path being effective to prevent the buildup of electrostatic charges in the fuel flowing through the filter and to thereby prevent arcing which can cause breakdown of the electrically non-conductive housing material.

2. The fuel filter of claim 1 wherein said coating covers the entire outside and inside surfaces of said housing.

3. The fuel filter of claim 2 wherein said coating is metal.

4. The fuel filter of claim 3 wherein said coating is one of the materials selected from the group consisting of nickel, chromium, stainless steel and aluminum.

5. The fuel filter of claim 4 wherein said coating is attached by a plating process.

6. The fuel filter of claim 5 wherein said coating is chromium.

7. The fuel filter of claim 7 wherein said conductive coating further acts as a barrier to evaporative emissions whereby fuel within said chamber cannot evaporate through the walls of the housing to the outside thereof.

8. The fuel filter of claim 7 wherein said coating comprises an electrically conductive coating covering substantially the entire of at least one of the outside surface of the housing and the inside surface of the housing.

9. The fuel filter of claim 8 wherein said coating is metallic.

10. The fuel filter of claim 9 wherein said coating is one of the materials selected from the group consisting of nickel, chromium, stainless steel and aluminum.

11. The fuel filter of claim 9 wherein said coating is chromium.

12. The fuel filter of claim 7 wherein said coating comprises an electrically conductive means covering substantially the entire of both the outside and the inside surfaces of said housing.

* * * * *